Jan. 11, 1955    H. P. CALLAHAN ET AL    2,698,968
POLYMERIZATION PROCESS FOR POLYMERIZABLE ORGANIC
COMPOUNDS CONTAINING THE GROUP $CH_2=C<$
Filed Jan. 30, 1952

INVENTORS
HENRY P. CALLAHAN,
DONALD G. JORDAN,
BY
James T. Dunn
ATTORNEY

United States Patent Office 2,698,968
Patented Jan. 11, 1955

2,698,968

POLYMERIZATION PROCESS FOR POLYMERIZABLE ORGANIC COMPOUNDS CONTAINING THE GROUP CH$_2$=C<

Henry P. Callahan, Fairfield, and Donald G. Jordan, Stamford, Conn., assignors to American Cyanamid Company, New York, N. Y., a corporation of Maine Application January 30, 1952, Serial No. 268,986

8 Claims. (Cl. 18—58)

This invention relates to a process for polymerizing polymerizable organic compounds and, more particularly, to the polymerization and copolymerization of vinyl compounds. More specifically, this invention relates to a process for the polymerization of vinyl compounds such as styrene, acrylonitrile and the like and mixtures thereof by subjecting said polymerizable materials to polymerizing conditions while said polymerizable materials are contained in a sealed tube of a particular polymeric material namely polytrifluoromonochloroethylene or polytetrafluoroethylene. Still further, this invention relates to a polymerization process such as that outlined briefly hereinabove in which the polymerizable materials contained in the sealed tube are immersed in an inert liquid heat transfer medium that is normally liquid at the polymerization temperature and while subjecting said polymerizable material to such polymerizing conditions such as by heating, subjecting the tube to sufficient external pressure to equal at least the total vapor pressure of the polymerizing materials within the tube for a period of time sufficient to polymerize said polymerizable material to a state of polymerization sufficiently advanced so that the thermoplastic polymer is rigid enough at room temperature to retain its own shape without any noticeable deformation. Thereafter, the polymer may be cooled, if necessary, and the tube removed by mechanical or manual stripping.

One of the objects of the present invention is to polymerize polymerizable organic compounds and, more particularly, the vinyl compounds such as styrene, ring substituted styrene, side chain substituted styrenes, acrylonitrile and substituted acrylonitriles and the like and mixtures thereof. A further object of the present invention is to produce polymers of the vinyl compounds by subjecting such compounds to polymerization conditions while contained in a sealed tube of polytrifluoromonochloroethylene or polytetrafluoroethylene while said sealed tube is immersed in an inert liquid heat transfer medium that is normally liquid at polymerization temperatures. A further object of the present invention is to maintain external pressure on the sealed tube during the polymerization reaction which is sufficient to equal at least the total vapor pressure of the polymerizing materials within the tube. These and other objects of the present invention will be discussed more fully hereinbelow.

A great number of different methods have been devised for the polymerization of polymerizable organic compounds such the the vinyl compounds. Emulsion polymerization has been practiced for certain purposes, while bulk polymerization has been found to be an advantageous process for other purposes. Still other processes for the polymerization of these organic compounds have been advanced but in each instance the particular process presents difficulties which render such a process undesirable either because of the commercial inexpediences associated with such techniques or because of the deleterious effects which seem to creep into the ultimate product inescapeably. Bulk polymerization has many attractive features to it but generally the cross-sectional area of the reaction chamber is definitely limited because of the bad heat transfer characteristics of most polymerizable materials, causing difficulties to arise in the control of the process itself, particularly when a heat sensitive compound, such as acrylonitrile, is one of the reacting monomers used to produce a polymer or copolymer. Attempts have been made to conduct these polymerization reactions by limiting the diameter of the reaction chamber in such a way that the heating of the reaction mass can be more readily controlled. This expedient created a number of problems. The principal one being that metallic chambers readily become bonded to the reaction mass so that the removal of the reaction product from the chamber presented very serious difficulties. Other processes following along these lines have considered using in the place of the metallic chamber such materials as extruded nylon, cellophane and even paper but in practicing these techniques, it is found that, for instance, in the use of cellophane, that the containing film becomes so securely anchored to the polymerized mass that it is removed therefrom only with extreme difficulty if at all or the containers are not sufficiently strong to withstand the internal pressures which develop in the course of the reaction due to the combined vapor pressures of the reacting materials within the container. In the earlier stages of the polymerization reaction, particularly when acrylonitrile is one of the monomers being polymerized, the vapor pressure developed by the polymerization reaction may well be sufficient to burst a tube-like container made of extruded nylon, cellophane or the like. We have discovered that we can polymerize these vinyl compounds by introducing these monomers into a tube of a polymeric material such as polytrifluoromonochloroethylene or polytetrafluoroethylene, sealing the tube by any conventional means such as heat sealing or even by the use of mechanical clamps and inserting said tube into a liquid medium contained in an autoclave, wherein the tube is completely immersed in an inert liquid heat transfer medium that is normally liquid at the polymerization temperature and subjecting said tube to an external pressure during the heating period. This pressure can be exerted by applying a gas such as nitrogen or air, CO, CO$_2$, He, CH$_4$, and the like under pressure to the void above the liquid medium in the autoclave or the autoclave may be filled completely with the liquid medium so that in the course of the heating step the pressure developed because the cubical expansion of the liquid will exert enough pressure on the sealed tube so that the amount of pressure exerted is at least equal to and preferably slightly greater than the total vapor pressure of the reacting materials.

Reference is made to the accompanying drawing in which the figure shows a vertical view partially in section of an embodiment of the apparatus which may be used in the practice of the process of the present invention. The symbol 1 is used to indicate the shell of the reacting chamber which is a rigid body preferably made of steel which is used to contain the monomer filled sacks in the liquid heat transfer medium. 2 represents the dome of the autoclave which is fastened to the cylindrical shell 1 by means of the thumb screws 11 which provide a liquid and air-tight connection through the assistance of the gasket 12. The upright supports 3, 3a are connected to the horizontal supports 6, 6a, which constitute in combination the framework to which the sacks 4 may be fastened during the polymerization reaction. The framework supporting the sacks rests on the mounted platform 7 containing the apertures 8 through which the fluid 5 is permitted to pass as it is being circulated through the system. This frame rests on the support 7 by means of the legs 23. The fluid medium 5 passes downwardly through the aperture 27 and is drawn through the pipe 13 and forced through the pump 14 up through the pipe 24 to the heat exchanger 15 which is heated by passing an appropriate heat exchange fluid such as Dowtherm A into the exchanger 15 by means of the pipe 16 and is returned to the boiler through the pipe 17. The fluid passing through the heat exchanger is forced up through the tube 25 and through a conventional temperature recorder and controller 18. After passing the control point 18, the fluid is forced through the tube 26 back into the chamber 1 through the aperture 29. The valve 19 is a hand pressure relief valve to be used for the purpose of releasing the pressure on the system and adjusting said pressure until it at least equals the vapor pressure of the reacting monomeric material within the tubes 4. The safety relief valve 20 is designed to permit the pressure on the system to drop automatically when said pressure exceeds a certain maximum tolerable value. The plug 28 may be fitted with a coupling when it is desired to use an inert gaseous medium above the liquid heat transfer medium. The plug 28 may be removed and the gas introduced into the upper part of the system at the desired pressure. The valve 22 serves as a drain for the purpose of removing the heat transfer medium at the end of a given reaction if it is so desired. The frame 3, 3a, 6, 6a can be lifted bodily from the autoclave after the dome-like cover 2 has been removed by attaching appropriate lifting members through the holes 10, 10a in the support locking members 9, 9a.

In the practice of the process of the present invention, one may conduct the polymerization reaction at any temperature up to about 190° C., which is the approximate disintegration temperature of the films of polytrifluoromonochloroethylene or polytetrafluoroethylene. For said polymerization reactions, one could use room temperature, i. e., about 25° C. or even temperatures below room temperature such as 0° C. or below. The particular reaction temperature selected will depend principally upon the type or types of monomeric materials which are being polymerized. If one wished to make a butadiene polymer or copolymers, one may wish to use temperatures between about 0° C. and 30° C., particularly if one chooses to use a polymerization catalyst in the system. This approach would be equally applicable to a great number of the other polymerizable monomers whether a catalyst were used or not but particularly where a polymerization catalyst such as a room temperature catalyst were to be used. When these catalysts are used they sometimes have the tendency to produce discolorations in the polymerized product upon further processing and for that reason they are sometimes preferably avoided. If the polymerization reaction is carried out at low temperatures such as at about 0° C.–30° C., the period of time required to accomplish the polymerization is generally prolonged, running into weeks and, in certain instances, months. This is not generally desired in a commercial operation as production in volume quantities is generally desired and the time factor places a very definite limitation on the production of volume quantities at low temperatures. As a consequence, then, it is generally desired to apply heat to the reacting monomers primarily for the purpose of increasing the rate of polymerization. For instance, if one wished to polymerize styrene or to copolymerize styrene and acrylonitrile, one would choose temperatures between about 70° C.–130° C. and preferably 85° C. and 120° C. In certain instances, it may be desired to initiate the polymerization reaction at 85° C. for a period of time and to increase the temperature thereafter to 95–100° C. for an additional period and finally to complete the polymerization at about 110–120° C. The preceding discussion has been set forth primarily for the purpose of illustrating the various techniques that may be adopted in bulk polymerization in keeping with the concepts of the present invention but specific enumeration of detail therein should not be interpreted as limitations on the case except as indicated in the appended claims.

The films of polytrifluoromonochloroethylene and polytetrafluoroethylene are very highly unreactive films and, as a consequence, one would have little or no difficulty in selecting a liquid heat transfer medium which would be inert with respect to the films. It has been indicated hereinabove, however, that the inert liquid heat transfer medium should be one which is normally liquid at the polymerization temperature. Consequently, one could select as such a medium, material, such as water; aliphatic hydrocarbons such as pentane, heptane, decane and the like or aromatic hydrocarbons such as benzene, xylene, aliphatic alcohols such as methanol, ethanol, butanol and the like; polyhydric alcohols such as ethylene glycol, glycerol, pentaerythritol and the like. Ordinarily, one would select the conventional heat transfer mediums such as Dowtherm A (a eutectic mixture of diphenyl oxide and diphenyl) or Nujol (a mineral oil). It can be seen from this that practically any material which is liquid at the polymer temperature can be used because of the markedly inert characteristics of the two types of films which are used in the practice of the process of this invention. It is, however, desired that the inert heat transfer medium be one which is not only liquid at the polymerization temperatures but also that it be one which is comparatively high boiling.

Amongst the monomeric organic compounds which may be used in the practice of the process of the present invention are those containing the polymerizable groups $CH_2=C<$. The vinyl compounds such as styrene per se and the substituted styrenes both ring and side chain substituted styrenes, e. g. α methyl styrene, α chloro styrene and the like, o-methyl styrene, p-methyl styrene, m-methyl styrene, 2,4-dimethyl styrene, 2,5-dimethyl styrene, 2,4,5-trimethyl styrene, p-ethyl styrene, o-bromo styrene, 2-bromo-4-ethyl styrene, p-isopropyl styrene, p-chloro styrene, 2,4-dichlorostyrene may be employed in our process. Similarly, one could use, as the monomeric compounds, any of those compounds containing a $CH_2=CH—CH_2$-group. Other specific vinyl compounds which may be mentioned are the vinyl compounds which include ketones such as monovinyl ketone, methyl isopropenyl ketone, ethyl vinyl ketone, propyl vinyl ketone and phenyl vinyl ketone; vinyl carboxylates such as vinyl formate, vinyl acetate, vinyl chloroacetate, vinyl propionate, vinyl bromo propionate, vinyl stearate; vinyl halides such as vinyl chloride, vinyl bromide, even heterocyclic compounds such as vinyl phthalimide, vinyl carbazol, vinyl pyrrolidone and the like.

This invention is also applicable to the polymers of such substances as butadiene, isoprene, acrylonitrile and haloprenes such as chloroprene. Still further these polymerizable monomers may include allyl or methallyl esters such as allyl acetate, allyl propionate, allyl chloroacetate, allyl alpha propionate, allyl caproate, allyl levolinate, allyl benzoyl benzoate, allyl benzoate, methallyl acetate, allyl laurate, allyl stearate, allyl esters of vegetable oil fatty acids such as the allyl esters of linseed oil fatty acids, allyl myristate, allyl undecylenate, allyl cyanoacetate and the like.

The process of the present invention is particularly applicable to polymerizable acrylic compounds such as acrylic acid, its homologues such as methacrylic, ethacrylic, α ethyl acrylic, α chloroacrylic and $α,β$ dimethyl acrylic acids and derivatives thereof, such as the anhydrides, amides, nitriles and esters of alcohols such as methyl, ethyl, propyl, butyl, isobutyl, amyl, hexyl, cyclohexyl, heptyl, octyl and decyl or esters of nitro alcohols, such as 3-nitro-2-butanol, 2-nitro-3-hexanol, 2-methyl-2-nitro-1-butanol and 2-nitro-2-methyl propyl alcohol and polyhydric alcohols such as ethylene glycol, diethylene glycol, glycerol and the like.

The process of the present invention is further applicable to the copolymerization of allyl ketones such as allyl methyl ketone, allyl ethyl ketone, 2-chloroallyl methyl ketone and the like; vinyl compounds such as vinyl propyl succinate, vinyl butyl phthalate, vinyl diethyl citrate and the like.

In carrying out the process of the present invention the use of a catalyst is not necessary but, in certain instances, it may be desirable to use a catalyst in which event one could make use of any of the conventional catalysts which are commercially used in the general polymerization of these types of organic compounds. For instance, one could make use of benzoyl peroxide or the alkyl or cycloalkyl peroxides and hydroperoxides such as tertiary butyl hydroperoxide, ditertiary butyl peroxide, tetralin hydroperoxide, 1-hydroxy-1-cyclopentylhydroperoxide-1, 1-hydroxy-cyclohexyl-hydroperoxide-1, 1-hydroxy-cycloheptyl-hydroperoxide-1, tertiary butyl propyl peroxide, tertiary butyl pentamethyl ethyl peroxide, 2,2-bis (tertiary butylperoxy)butane and the like.

In conjunction with these peroxide catalysts, one may wish to make use of an accelerator to the polymerization in the nature of the so-called metallic driers such as the naphthenate salts of cobalt, iron, copper, manganese, lead and the like.

If a catalyst is used, it should be present in catalytic amounts such as about 0.001% up to about 1.0% by weight based on the weight of the monomers although larger amounts may be used such as amounts up to about 5%. If it is desired to use a combination catalyst and accelerator such as the metallic driers referred to hereinabove, the amount of drier present would vary appreciably from about 0.004% up to about 0.01% by weight based on the total weight of the polymerizable monomers. In order to avoid the danger of a violent reaction, however, in carrying out the polymerization, one should avoid the use of large amounts of the metallic salt drier if the amount of catalyst present is rather substantial.

The amount of time required for carrying out the process of the present invention will depend on at least two principal factors, namely, the reaction temperature and the presence or absence of catalytic agents. One can use temperatures between about 0° C. and 190° C. If low temperatures (0–30° C.) are selected, and no catalytic agent is used, the reaction will take place over a prolonged period of time. If low temperatures such as 0–30° C. are used, and a catalyst is used, the reaction time will be appreciably shortened. If higher temperatures such as 80–130° C. are used in the absence of a catalyst, the reaction time will be comparatively brief but if these elevated temperatures are used together with a catalytic agent, the reaction time will be very appreciably diminished. It will be seen from this that the time required for the polymerization to take place will vary rather substantially depending upon the particular conditions of the reaction. It should be sufficient to state that the reaction is permitted to continue until the polymer formed is a semi-rigid- to rigid-solid, or to express it in another way, the polymer should be rigid enough at room temperature to retain its own shape, notwithstanding its thermoplastic characteristics.

The diameter of the sealed tube containing the polymerizable material should not be appreciably greater than about 2–3 inches. This enables the heat of reaction to be dissipated and lends to greater control of said heat of reaction. The length of such a tube is in no way critical, depending only on the size of the container for the inert liquid in which the tube or tubes are immersed. The thickness of the tube wall is in no way critical and will depend primarily on the thickness of the available sheets of the films of polytrifluoromonochloroethylene or polytetrafluoroethylene. These films come in thicknesses varying between about 0.002 and 0.02 inch. Thicker film could be used but any film exceeding about 0.25 inch may tend to hamper the operation. Films thinner than 0.002 inch could readily be used provided that they were strong enough to contain the materials inside without bursting at least until the sack-like tube is immersed in the heating liquid medium. To withstand pressure from within until immersion, one could protect the sack-like tube with a wire screened cage which could be left on during the polymerization reaction. When the polymerization reaction is completed, the polymer contained in the sack is removed from the heating medium and when solidified, the sack or tube can be stripped off of the solid polymer very readily in a mechanical or manual operation. Unlike some of the other film-like containers, which have been suggested for use in polymerization reactions, it is unnecessary and inadvisable to make use of a solvent for the purpose of trying to remove the film sack. It is unnecessary because the film can be stripped off very readily from the solid polymer and it is inadvisable because the films used in the process of the present invention are practically completely inert with respect to all solvents.

A further departure from the concept of the present invention may be accomplished by prepolymerizing the polymerizable organic compounds by some conventional method such as by the continuous processes for such polymerization, several of which are well known in the art, until the reacting mixture contains a mixture of polymeric and monomeric material. This prepolymerization reaction can be permitted to proceed until the percentage of polymer present varies between about 20% and 50% of the total weight of initial reactants. In certain polymerization reactions, it is generally not possible to carry out the polymerization in the conventional continuous processes beyond about 50% polymer based on the total weight of polymer and monomer. This is due to the fact that the mixtures of the polymer and the monomer in concentrations greater than about 50% polymer are so viscous that it is no longer possible to continue pumping the reactants through the reaction chambers. When the prepolymerization step has been completed as indicated hereinabove, one may charge the tube-like sacks with the viscous mixture of polymer and monomer, seal said sacks and insert them into the inert heat transfer liquid medium and the fundamental concept of the present invention may then be carried out to completion. This departure from the fundamental concept of the present invention will not save any appreciable amount of time but will result in a rather substantial saving on capital, equipment, labor and space.

In order that the concepts of the present invention may be more completely understood, the following examples are set forth in which all parts are by weight. It should be remembered that these examples are set forth solely for the purpose of illustration and any specific enumeration of detail contained therein should not be interpreted as a limitation on the case except as indicated in the appended claims.

Example 1

A mixture of 70 parts of monomeric styrene and 30 parts of monomeric acrylonitrile is introduced into a tube-like sack of polytrifluoromonochloroethylene. The tube is fabricated from a sheet of polymeric trifluoromonochloroethylene, folded along its major axis and heat sealed along the edges opposite the fold and clamped by a mechanical type of clamp at the bottom edge. After introducing the mixture of the monomeric material, the tube is sealed at the top edge, by a mechanical clamp, and introduced into a bomb type container of the type described, which container is partially filled with a heavy mineral oil such as Nujol. The filled tube is about 2 inches in diameter. The Nujol completely covers the sack-like tube and the space above the oil is filled with nitrogen gas at approximately 35 p. s. i. pressure. The bomb type container is then placed in an atmosphere of steam at 100° C. and allowed to remain in such atmosphere for approximately 1 week. Thereafter, the nitrogen gas is vented, the container opened and the sack containing the rigid copolymer is removed. After removing the clamps, the film of polymeric trifluoromonochloroethylene is easily peeled from the copolymer.

Example 2

Example 1 is repeated except that the bomb type container into which the monomer containing sack is inserted, is filled completely with the mineral oil and upon heating to the reaction temperature, the oil expanded through a pressure relief valve until a pressure of about 35 p. s. i. is reached. In all other respects, the reaction was carried out as described in Example 1.

Example 3

A mixture of 70 parts of monomeric styrene and 30 parts of monomeric acrylonitrile is prepolymerized at room temperature to a conversion of approximately 20% polymer at which point a very viscous syrup is obtained. The viscous syrup thus produced is then introduced into a sack-like tube of polytrifluoromonochlorethylene and the reaction is carried out to completion as indicated in Example 1 hereinabove.

We claim:

1. A process for polymerizing a mixture of monomeric acrylonitrile and a monomeric compound selected from the group consisting of styrene, ring-substituted alkyl styrene and ring-substituted halo styrene which comprises heating at a temperature up to about 130° C. said mixture contained in a sealed tube of a polymeric material selected from the group consisting of polytrifluoromonochloroethylene and polytetrafluoroethylene immersed in an inert liquid heat transfer medium that is normally liquid at the polymerization temperature contained in a closed zone, subjecting said tube maintained in said closed zone during the heating period to an external pressure sufficient to equal at least the total vapor pressure of the reacting material, continuing said heating under external pressure until the copolymer formed is rigid enough at room temperature to retain its own shape, thereafter cooling the copolymer thus produced and removing said sealed tube containing the copolymer formed from said closed zone.

2. A process for polymerizing a mixture of monomeric acrylonitrile and a monomeric compound selected from the group consisting of styrene, ring-substituted alkyl styrene and ring-substituted halo styrene which comprises heating at a temperature up to about 130° C. said mixture contained in a sealed tube of polymeric trifluorochloroethylene immersed in an inert liquid heat transfer medium that is normally liquid at the polymerization temperature contained in a closed zone, subjecting said tube maintained in said closed zone during the heating period to an external pressure sufficient to equal at least the total vapor pressure of the reacting material, continuing said heating under external pressure until the copolymer formed is rigid enough at room temperature to retain its own shape, thereafter cooling the copolymer thus produced and removing said sealed tube containing the copolymer formed from said closed zone.

3. A process for polymerizing a mixture of monomeric acrylonitrile and monomeric styrene which comprises heating at a temperature up to about 130° C. said mixture contained in a sealed tube of a polymeric material selected from the group consisting of polytrifluoromonochloroethylene and polytetrafluoroethylene immersed in an inert liquid heat transfer medium that is normally liquid at the polymerization temperature contained in a closed zone, subjecting said tube maintained in said closed zone during the heating period to an external pressure sufficient to equal at least the total vapor pressure of the reacting material, continuing said heating under external pressure until the copolymer formed is rigid enough at room temperature to retain its own shape, thereafter cooling the copolymer thus produced and removing said sealed tube containing the copolymer formed from said closed zone.

4. A process for polymerizing a mixture of monomeric acrylonitrile and monomeric styrene which comprises heating at a temperature up to about 130° C. said mixture contained in a sealed tube of polymeric trifluoromonochloroethylene immersed in an inert liquid heat transfer medium that is normally liquid at the polymerization temperature contained in a closed zone, subjecting said tube maintained in said closed zone during the heating period to an external pressure sufficient to equal at least the total vapor pressure of the reacting material, continuing said heating under external pressure until the copolymer formed is rigid enough at room temperature to retain its own shape, thereafter cooling the copolymer thus produced and removing said sealed tube containing the copolymer formed from said closed zone.

5. A process for polymerizing a mixture of 30 parts of monomeric acrylonitrile and 70 parts of monomeric styrene which comprises heating at a temperature up to about 130° C. said mixture contained in a sealed tube of polymeric trifluoromonochloroethylene immersed in an inert liquid heat transfer medium that is normally liquid at the polymerization temperature contained in a closed zone, during the heating period to an external pressure sufficient to equal at least the total vapor pressure of the reacting material, continuing said heating under external pressure until the copolymer formed is rigid enough at room temperature to retain its own shape, thereafter cooling the copolymer thus produced and removing said sealed tube containing the copolymer formed from said closed zone.

6. The process according to claim 2 in which the monomeric compound is para-methyl styrene.

7. The process according to claim 2 in which the monomeric compound is 2,4-dimethylstyrene.

8. The process according to claim 2 in which the monomeric compound is para-chloro styrene.

References Cited in the file of this patent

UNITED STATES PATENTS

| | | |
|---|---|---|
| 2,406,403 | Rogers | Aug. 27, 1946 |
| 2,485,798 | Whyete et al. | Oct. 25, 1949 |
| 2,488,446 | Swiss | Nov. 15, 1949 |
| 2,576,712 | Boyko | Nov. 27, 1951 |

OTHER REFERENCES

Plastics, July 1946, pages 32, 34, 97, article entitled "Teflon."

Kel-F, Technical Bulletin No. 1-12-49, 5 pages, published by M. W. Kellogg Co., Jersey City, New Jersey. Received by Patent Office Library, March 6, 1950.